United States Patent
Capman et al.

(10) Patent No.: US 8,447,614 B2
(45) Date of Patent: May 21, 2013

(54) METHOD AND SYSTEM TO AUTHENTICATE A USER AND/OR GENERATE CRYPTOGRAPHIC DATA

(75) Inventors: François Capman, Le Chesnay (FR); Sandra Marcello, Paris (FR); Jean Martinelli, Paris (FR)

(73) Assignee: Thales, Neuilly sur Seine (FR)

( * ) Notice: Subject to any disclaimer, the term of this patent is extended or adjusted under 35 U.S.C. 154(b) by 435 days.

(21) Appl. No.: 12/644,479

(22) Filed: Dec. 22, 2009

(65) Prior Publication Data

US 2010/0223057 A1     Sep. 2, 2010

(30) Foreign Application Priority Data

Dec. 23, 2008 (FR) ...................................... 08 07408

(51) Int. Cl.
*G10L 21/00* (2006.01)
*G10L 17/00* (2006.01)

(52) U.S. Cl.
USPC .......................................... 704/273; 704/246

(58) Field of Classification Search
USPC .......................................... 704/246, 270, 273
See application file for complete search history.

(56) References Cited

U.S. PATENT DOCUMENTS

| | | | | |
|---|---|---|---|---|
| 5,712,905 | A * | 1/1998 | Shaw et al. ................. | 379/93.02 |
| 6,266,640 | B1 * | 7/2001 | Fromm ......................... | 704/273 |
| 7,024,363 | B1 * | 4/2006 | Comerford et al. ........... | 704/270 |
| 7,386,448 | B1 * | 6/2008 | Poss et al. ..................... | 704/247 |
| 2004/0204943 | A1 * | 10/2004 | Kirovski et al. ............... | 704/273 |
| 2006/0059001 | A1 * | 3/2006 | Ko ................................. | 704/273 |
| 2007/0162283 | A1 * | 7/2007 | Petrushin ....................... | 704/255 |
| 2007/0239451 | A1 * | 10/2007 | Luan et al. ..................... | 704/246 |

OTHER PUBLICATIONS

Monrose, et al, 2001. "Cryptographic Key Generation From Voice." Proceedings of the 2001 IEEE Symposium on Security and Privacy, May 14-16, 2001. pp. 202-213.

Garcia-Perera, et al, 2006. "Parameter Optimization in a Text-Dependent Cryptographic-Speech-Key Generation Task." Non-Linear Analyses and Algorithms for Speech Processing in Computer Science; Lecture Notes in Artificial Intelligence, pp. 92-99.

* cited by examiner

*Primary Examiner* — Douglas Godbold
(74) *Attorney, Agent, or Firm* — Stroock & Stroock & Lavan LLP

(57) ABSTRACT

System and process for audio authentication of an individual or speaker including a processor for decomposing an audio signal received at the sensor into vectors representative of the speaker to be authenticated for transforming the super-vector V of the speaker resulting from the concatenation of the vectors associated with the said speaker into binary data 1001100 . . . 0 taking as an input the mean super-vector M resulting from the mean super-vector, and comparing the super-vector V of the speaker with the mean super-vector M, the said binary data thus obtained being transmitted to a module for extracting the speaker authentication taking as an input the public keys Kpub(l) in order to authenticate the speaker and/or to generate a cryptographic key associated with the speaker.

3 Claims, 4 Drawing Sheets

Construction of the reference dictionary

Construction of the dictionary associated with a speaker

METHOD AND SYSTEM TO AUTHENTICATE A USER AND/OR GENERATE CRYPTOGRAPHIC DATA

CROSS REFERENCE TO RELATED APPLICATIONS

The present application claims priority to French Patent Application Serial No. 0807408, filed on Dec. 23, 2008, which is hereby incorporated by reference in its entirety.

FIELD OF THE INVENTION

The subject of the present invention is a process and system allowing authentication of a user, and possible generation of a cryptographic data item, such as a cryptographic key, associated with a speaker. It is used for the accurate authentication of a speaker without storage of any data characterizing this speaker.

The invention is used to generate encryption or cryptographic keys. It applies to all recognition systems in which biometric data used for recognition can be converted to a vector format which is then transformed to binary data.

BACKGROUND OF THE INVENTION

In the description, the following definitions and parameters are used.

The term "cepstrum" is a type of vector representative of the spectral content extracted from a speech or audio signal, based on a hypothesis of production of a source-filter type signal. Centroids are vectors representative of a cepstral vector class. The set of these centroids constitutes a dictionary obtained for example by implementing a learning algorithm known to those skilled in the art, example algorithms are given in the following description.

Currently, identification or authentication systems using biometric parameters are very widespread. Of all these types of biometrics, speaker recognition is the technique most accepted by the user, because it is non-intrusive and does not require any contact with the system reader. This is the same for authentication systems based on iris recognition. On the other hand, speaker recognition is particularly suitable for applications implemented over telephone networks, permitting remote and centralized processing on a server. The variation between the voices of different individuals originates from three distinct factors; morphological differences, physiological differences and socio-cultural differences. The first of these factors changes during adolescence, but stabilizes. The other factors are not stable and can vary over time. These factors added to the environmental noise distortions and to the quality of the voice recognition device, or the voice recording cause large variations between the same speaker. This increases the difficulty in recognizing an individual during his authentication.

In spite of these factors limiting the correct use, there are a large number of applications for which authentication based on voice is still the most recommended. For example, worthy of mention is the use of voice recognition with mobile phones, the associated services, for example the consultation of bank details, etc., the latter in complete security, without any fear that an ill-intentioned individual will succeed in getting hold of data characterizing this individual. (The use of biometric data imposes a stringent requirement for the user to be physically present and is more robust than use of a password alone).

There is currently a need for a system allowing precise authentication of the speaker without storage of data likely to betray his identity or information relating to his private life.

The article by Monrose et al. entitled "Cryptographic Key Generation from Voice", which appeared in the Proceedings of the 2001 IEEE Symposium on Security and Privacy May 2001, which is incorporated by reference herein, describes a system allowing cryptographic key generation from the voice of an individual. Even if it is effective, this system nevertheless suffers from the disadvantage of requiring the use of a database in which information characterizing the speaker can be stored.

SUMMARY OF THE INVENTION

To summarize, in the course of its implementation, an embodiment of the process uses the following steps:

A first step allows configuration of the recognition system. It is independent of the users and comprises selection of the reference speakers, selection of the system parameters (configuration) and construction of a reference dictionary which will be stored in the inventive recognition system. During this step a mean super-vector is likewise created. This first step can be carried out prior to the process, in which case the process will use the result of this step.

A second step is a learning step or a step of enrolment of different users or speakers I; in the course of this learning step, the process generates the public data Kpub(I) for a speaker (I) (which is also referred to as a public key) associated with the learning vocal sequence of a speaker I. This public data alone does not allow reconstruction of the initial voice signal.

A third step involves use of the system for the recognition or authentication of an individual and/or generation of a cryptographic key associated with an individual; a new dictionary is constructed this time from the test voice sequence of the speaker to be recognized or authenticated and the process applies a fuzzy extractor known to those skilled in the art, of which an example is given in the publication by Y. Dodis, L. Rezin and A. Smith entitled "Fuzzy extractors: how to generate strong keys from biometrics and other noisy data" Eurocrypt 2004 LNCS 3027 p.79-100 Springer-Verlag 2004, or Y. Dodis, R. Ostrovski, L. Rezin and A. Smith SIAM Journal of computing 38 (1) 97-139 2008) or a method having the same functionality which likewise takes as an input the public data Kpub(l) associated with the speaker which was constructed during the enrolment phase as well as the binary data constructed from the test sequence. The main function of the fuzzy extractor is to recognize or authenticate the speaker and to generate a cryptographic key or a secret data item associated with this speaker if he has been correctly recognized or authenticated. If only recognition of the speaker or his authentication is required, a "secure sketch" type method, known to those skilled in the art, is used.

The following notation is used for the voice recognition example:

L, the number of reference speakers, used for construction of the reference dictionary,
P the size of the vectors resulting from the voice synthesis,
Nr, the total number of cepstral vectors for the set of reference speakers,
Nc, the number of centroids of the reference dictionary, and the dictionaries generated from the speech sequences of the speakers to be identified (test speakers), M, the total number of cepstral vectors for the test speaker.

Likewise, the following definitions are used: the concatenation of the vectors of one and the same dictionary constitutes a super-vector. It is the super-vector constructed from the dictionary of the speaker to be authenticated which is converted to binary data. The term "super-vector" likewise applies to a dictionary obtained by the vector quantization approach or by GMM modelling, both described below.

The dictionaries and therefore the associated super-vectors are ordered: each centroid is supposed to be representative of one and the same zone within the acoustic space whoever the speaker is. This property is obtained by construction.

The invention relates to a system for audio authentication of an individual or speaker I characterized in that it comprises a combination of at least the following elements:
  A sensor for one or more audio parameters associated with the said individual,
  A module for extracting the acoustic parameters from the audio signal,
  A mean model or mean super-vector M representative of the population to be authenticated,
  A reference database,
  A database containing the public keys Kpub(l) of the individuals to be authenticated;
  A processor adapted:
    to decompose an audio signal received by the sensor into vectors representative of the speaker I to be authenticated, to transform the super-vector V of the said speaker I resulting from the concatenation of the vectors associated with the said speaker I into binary data 1001100 . . . 0 taking as an input the mean super-vector M resulting from the mean super-vector, and comparing the super-vector V of the speaker with the mean super-vector M,
    the said binary data thus obtained being transmitted to a module for extracting the speaker authentication taking as an input the public keys Kpub(l) in order to authenticate the speaker and/or to generate a cryptographic data item associated with the said speaker I.

The data are, for example, speech signals, and the said processor is adapted to convert the said speech signals into acoustic parameters, such as cepstra, LSFs, formants.

The audio signal is a speech signal and the said processor is adapted to transform the speech signals into cepstral vectors.

The processor is, for example, adapted to determine the centroids associated with the cepstral (acoustic) vectors of a speaker and to execute the transformation of the centroids into binary data using at least a significant bit, by executing the following steps:
comparison of the speaker super-vector $V=(v_i)_{i=0,\ldots L-1}$ with the mean super-vector $M=(m_i)_{i=0,\ldots L-1}$
  weighting of each centroid $c_i$ dependent on the number of vectors extracted from the associated speech signal.

The invention in an embodiment also relates to a process for audio authentication of an individual characterized in that it comprises a combination of at least the following steps:
  recording of an audio signal representative of a speaker to be authenticated and extraction of acoustic parameters from the audio signal,
  definition of a mean super-vector M representative of the population to be authenticated,
  determination of the public keys Kpub(l) of individuals subject to authentication by the process,
    decomposition of the audio signal received into vectors representative of the speaker I to be authenticated, transformation of the super-vector of the said speaker I resulting from the concatenation of the vectors associated with the said speaker into binary data 1001100 . . . 0 taking as an input the mean super-vector M resulting from the mean model, and comparing the super-vector of the speaker with the mean super-vector,
    the said binary data thus obtained being transmitted to a module for extracting the speaker authentication taking as an input the public keys Kpub(l) in order to authenticate the speaker and/or to generate a cryptographic data item associated with the said speaker I.

BRIEF DESCRIPTION OF THE DRAWINGS

Other characteristics and advantages of the present invention will become more apparent from reading the description of a non-limiting example and by referring to the attached drawings which represent.

DETAILED DESCRIPTION

In order to improve the comprehension of the principle of operation behind the inventive process and system, the following description is given for an individual voice recognition and authentication application. It also describes how to generate a cryptographic key associated with an individual.

Figure 1:
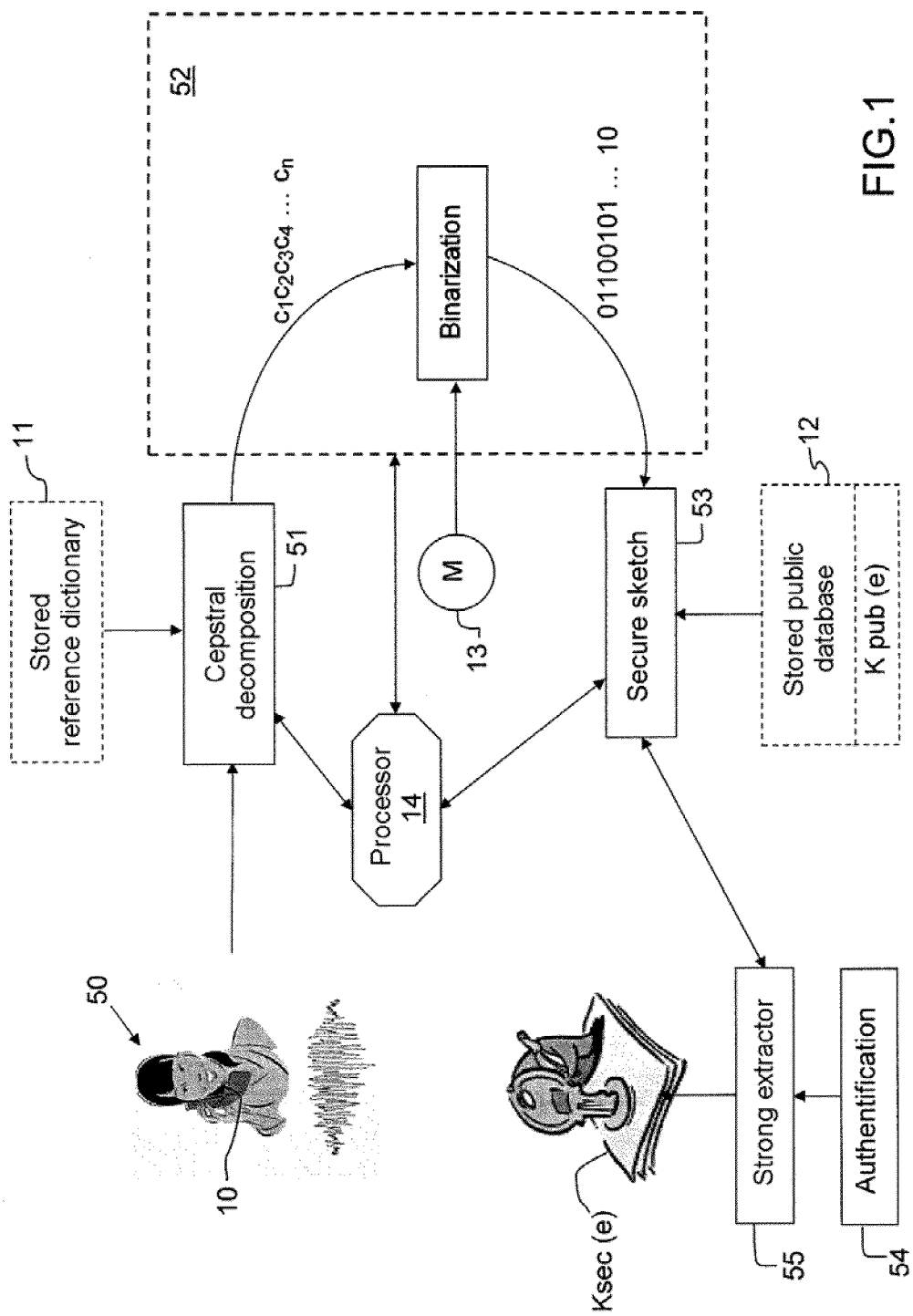
FIG. 1, an example of the inventive system,
  FIG. 2, steps implemented to construct a reference dictionary for initialization of the inventive system,
  FIG. 3, the steps executed to construct a dictionary or super-vector associated with a speaker, and
  FIGS. 4A, 4B and 4C, a representation of the weighting of the centroids, referred to as light or heavy.

In an embodiment, to implement the inventive process, a recognition system shown schematically in FIG. 1 comprises at least the following elements:
  A sensor 10 allowing the acquisition of the speech signal originating from the speaker to be authenticated,
  A database 11, corresponding to a reference dictionary, which can, in certain embodiments, be constructed outside the system. This dictionary comprises the super-vectors characteristic of a population of L speakers. This database 11 will be used to configure the system. This configuration can be carried out in the factory, for example.
  A database 12 containing the various public data generated for each speaker during the enrolment phase, this database is stored in the system during normal operation of the inventive recognition system. These data are necessary to find the identity of the speaker but do not betray any information about him.
  A mean super vector 13 which can be determined from L speakers, or taking into account another population L'; there are several ways to construct the mean super-vector. It is nevertheless preferable to use all the reference speakers to construct the mean super-vector in contrast to a mean super-vector obtained from the system users, which necessitates the availability of the corresponding data to be able to initialize the system.
  A processor 14 adapted to execute the steps of the inventive process which will be explained below. The steps include notably the transformation of data initially in the form of vectors into binary data, these binary data being subjected to a fuzzy extractor composed, for example, of the data item from a secure sketch and a strong extractor, the function of which is notably to identify the corresponding individual, taking into account the calculated mean model and the public data; notably the processor is adapted to execute the following modules: an extraction module 51 allowing the extraction of acoustic parameters (such as the cepstral analysis for example, generally used in speaker recognition) of the speech signal, a binarization module 52, the purpose of which is to transform a vector associated with a speaker into binary data, a module 53 known under the acronym of "secure sketch" which allows authentication of an individual and a module 54 or "strong extractor", such as a hash function known to those skilled in the art which allows generation of a secret key Ksec(I) associated with a speaker I.

The example of the hash function is given for illustrative purposes only, any function allowing generation of the public key could be used.

In the remainder of the description, dictionary terminology is used for the vector quantization approach, while model terminology is used for the "GMM" modelling (Gaussian Mixture Model). The term "super-vector" allows generic covering of these two approaches. In the first case, the super-vector corresponds to the concatenation of the vectors associated with the centroids of the dictionary, while in the second case, it relates to concatenation of the vectors associated with the means of each multi-dimensional Gaussian.

To characterize a speaker I, a speaker model is constructed which can take several forms according to the performance/complexity compromise desired. The most used modelling for speaker recognition is statistical modelling based on use of the GMM, Gaussian Mixture Model, of the distribution of the acoustic parameters extracted from the learning sequences. The parameters generally used are cepstral parameters which are representative of the vocal tract. The construction of a speaker model therefore consists of extraction of the cepstral parameters from the learning speech sequences and modelling of their statistical distribution using GMM modelling, for example.

The present invention also proposes, in a manner supplementary to the GMM modelling approach, a simpler method based on vector quantization principles, for example. The vector quantization method is also used for speaker recognition, very often when the quantity of available speech data is of restricted duration. Indeed, contrary to GMM, which requires the estimation of numerous parameters (means, variances and weights associated with each Gaussian), the method is limited to estimation of the means.

Dictionary construction uses the parameters and acoustic vectors (for example the cepstra) which correspond to the signal portions containing the speech. Detection of zones in the speech or activity can be carried out according to several methods, known to those skilled in the art.

Extraction of Cepstral Parameters

In a simplified way, the sound production system of a speaker is modelled by a source-filter system. This model is very widely used in speech processing (coding, speech recognition, speaker recognition etc.). The source signal is either a white noise for the sounds referred to as unvoiced, or a train of periodic impulses for voiced sounds. The period corresponds to the vibration frequency of the vocal cords (pitch, fundamental frequency). This source signal or excitation is passed through a filter which represents the vocal tract and is unique to the speaker. On the other hand, the shape of the vocal tract is associated with the different sounds produced by the speaker. Therefore effective modelling of the speaker requires, where possible, learning sequences which will incorporate the set of sounds and therefore optimally cover the acoustic space of the speaker. Extraction of cepstral parameters involves separation of the contributions due to the excitation signal and the vocal tract using a homomorphic deconvolution operation.

The speech signal which can be described as the signal resulting from the convolution of the excitation signal by the filter associated with the vocal tract, is transformed in the Fourier domain by short-term analysis using sliding windows. In general, the analysis is made approximately every 10 ms (duration of the quasi-stability of the speech signal) and using approximately 20 ms analysis windows. These values are also applicable for other analysis types (extraction of LPC or LSF coefficients for example). In the Fourier domain, the speech signal is thus represented as a term by term (of the same frequency) product of the components of the excitation signal and the filter. By applying the logarithm to the module of the Fourier transform of the signal it is then possible to obtain a representation of the speech signal by summing the contribution of the excitation signal and that of the vocal tract. In order to separate the two contributions, the logarithmic spectrum thus obtained is transformed into a pseudo-time domain, the cepstral domain, by an inverse Fourier transform. In this domain, the first coefficients are representative of the vocal tract (slow variations of the logarithmic spectrum) while the higher order coefficients are characteristic of the excitation signal (rapid variations of the logarithmic spectrum). The separation of the two contributions may then be simply implemented by an operation referred to as "liftering" which involves only retaining the lower order coefficients, possibly with an associated weighting.

Speech signal $s(n)$=convolution of the excitation signal $e(n)$ by the filter $h(n)$ $$s(n)=h(n)*e(n)$$

Speech signal in the Fourier domain $$S(z)=H(z)\times E(z)$$

Logarithmic spectrum $$\log[S(z)]=\log[H(z)]+\log[E(z)]$$

Cepstrum obtained by an inverse Fourier transform $$c_S(k)=c_H(k)+c_E(k)$$

Estimated cepstrum of the vocal tract based on liftering $$\hat{c}_H(k)=L(k)\times c_S(k)$$

Standard lifter:

$$L(k)=1 \text{ for } k<=\text{Ncep}$$

$$L(k)=0 \text{ for } k>\text{Ncep}$$

Order of magnitude Ncep=13 to 18

The first cepstral coefficient of index 0 is equivalent to the signal energy and therefore is not discriminatory where the speaker is concerned. By contrast, its derivatives (generally of the first and second order) are information carrying and can be incorporated in the acoustic vectors used in the invention. From a practical point of view, there are several variants for extracting the cepstral parameters obtained, either with the emphasis on reducing complexity, or by taking into account perceptual criteria or even by use of other signal analysis methods. Cited below, in a non-exhaustive manner, are the main types of cepstral parameters:

Real cepstra obtained by Fourier transform. Under consideration is an extraction process corresponding to the homomorphic deconvolution operation described above and undertaken using Fourier transform operators.

Cepstra obtained by an inverse cosine transformation applied to the logarithmic spectrum obtained after passage through a filter bank. If the filter bank is of linear frequency, the term LFCC (Linear Frequency Cepstrum Coefficients) is used. If the filter banks is non-linear, the naming term will depend on the non-linear scale used (Bark scale, Mel scale, parametric scale etc.). The most commonly used non-linear scale is the Mel scale known to those skilled in the art and the coefficients obtained are frequency cepstrum coefficients or "MFCC" (Mel Frequency Cepstrum Coefficients) known to those skilled in the art.

Cepstra obtained by conversion of the linear prediction coefficients obtained by an analysis of type LPC (Levinson-Durbin algorithm for example). In this case, LPCC (Linear Prediction Cepstrum Coefficients) are referred to. It is also possible to use a non-linear frequency scale by filtering (dephasing filters) the speech signal before analysis using linear prediction.

Under consideration here are the main types of cepstral parameters. It is also of interest to cite the PLP (Perceptual Linear Prediction) parameters, used in speech recognition and the corresponding cepstral parameters, as well as the LSF (Line Spectral Frequencies) parameters used in the field of speech coding.

More generally, the majority of the spectral parameters can be used to characterize the speaker from the point of view of the vocal tract. To improve these performances, time data, obtained by adding the first order time derivatives (Delta-cepstra for example) and second order time derivatives (Delta-delta-cepstra for example) of the cepstral parameters to the parameters themselves, is frequently added.

Lastly, it is possible to add parameters characteristic of the prosody (statistical distribution, pitch and energy trajectory) to further improve the performance and parameters more directly representative of the vocal tract, such as formants (resonant frequencies of the vocal tract).

Extraction of these parameters is, on the other hand, generally associated with detection of vocal activity or a selection criterion (energy, voice etc.) in order to prevent the taking into account of noise vectors.

Construction of the GMM Model

A GMM model corresponds to a weighted sum of N multidimensional Gaussians of which the dimension is equal to that of the parameters whose distribution is to be modelled. The algorithm used in the GMM model learning process using the set of input vectors is the EM algorithm (Expectation-Maximization), known to those skilled in the art. The number of Gaussians used for the speaker verification systems is in general between 256 and 2048. Therefore there are 3N parameters to estimate (means, variances and associated weights).

As the quantity of parameters to estimate is considerable, construction of a speaker GMM model is generally undertaken in two steps:

1. Teaching of a global GMM model (so-called global model) obtained from a large number of speakers and data (if possible representative of the target application, notably taking into account the acoustic channel and the transmission channel).
2. Construction of the speaker model by adaptation of the global model. In order to limit the time required during the learning phase and to obtain a robust speaker model, this is obtained by transformation of the global model based on a set which is smaller than that which would be necessary with direct learning. The algorithm most commonly used for adaptation of the global model is the MAP algorithm (Maximum A Posteriori) known to those skilled in the art.

Within the scope of the present invention, the quantity of data required to carry out learning is an important constraint for the targeted applications. In fact, the user naturally wants to reduce the duration of learning as far as possible. On the other hand, the complexity of the solution implemented is also linked to the number of parameters under consideration.

Therefore the inventive process also proposes an alternative to the GMM model, based on a simpler model by limiting itself to the construction of a dictionary of mean vectors. If it is possible to retain the same learning process as for the GMM model and then at the end to consider only the Gaussian means, the taking into account of the numerous parameters during the learning phase requires a significant quantity of speech data. One possible solution is then to also modify the learning phase. Again picking up the principle of a dictionary learnt using several speakers and without any particular constraint on the learning duration and basing the approach on an adaptation algorithm proposed by S. Furui, in his article entitled "Unsupervised speaker adaptation based on hierarchical spectral clustering", IEEE Transactions on acoustics, speech and signal processing vol 37 N° 12 Dec. 1989, the inventive idea is to propose a simplified construction outline for a dictionary representative of the speaker.

In the same way as for the GMM models, the process takes place in two steps:

A first step comprises construction of the reference dictionary (global dictionary) from data selected in advance from the speech body originating from several speakers. This dictionary will be used to configure the system. In effect it makes sense to use data close to the conditions of use envisaged for the system: speakers of the same mother tongue, identical or similar speech signal acquisition system, broad and balanced phonetic contents. The number L of reference speakers is independent of the number of system users and the construction of the reference dictionary does not require any information specific to the users. Optimum performance will be obtained by increasing the data quantity and number of speakers in order to improve coverage of the acoustic space of the speakers. Where GMM modelling is concerned, a global or universal model is referred to.

A second step involves use of the learning data of the speaker who is to be modelled in order to construct the speaker dictionary from the reference dictionary. This dictionary will be used during the authentication system learning phase and also during the usage phase for individual recognition. A first learning voice sequence will allow generation of a first speaker dictionary which is not preserved in the system but which will subsequently serve to generate the public data Kpub(l) stored for each speaker I.

Construction of the Reference Dictionary $D_{ref}$

Figure 2:
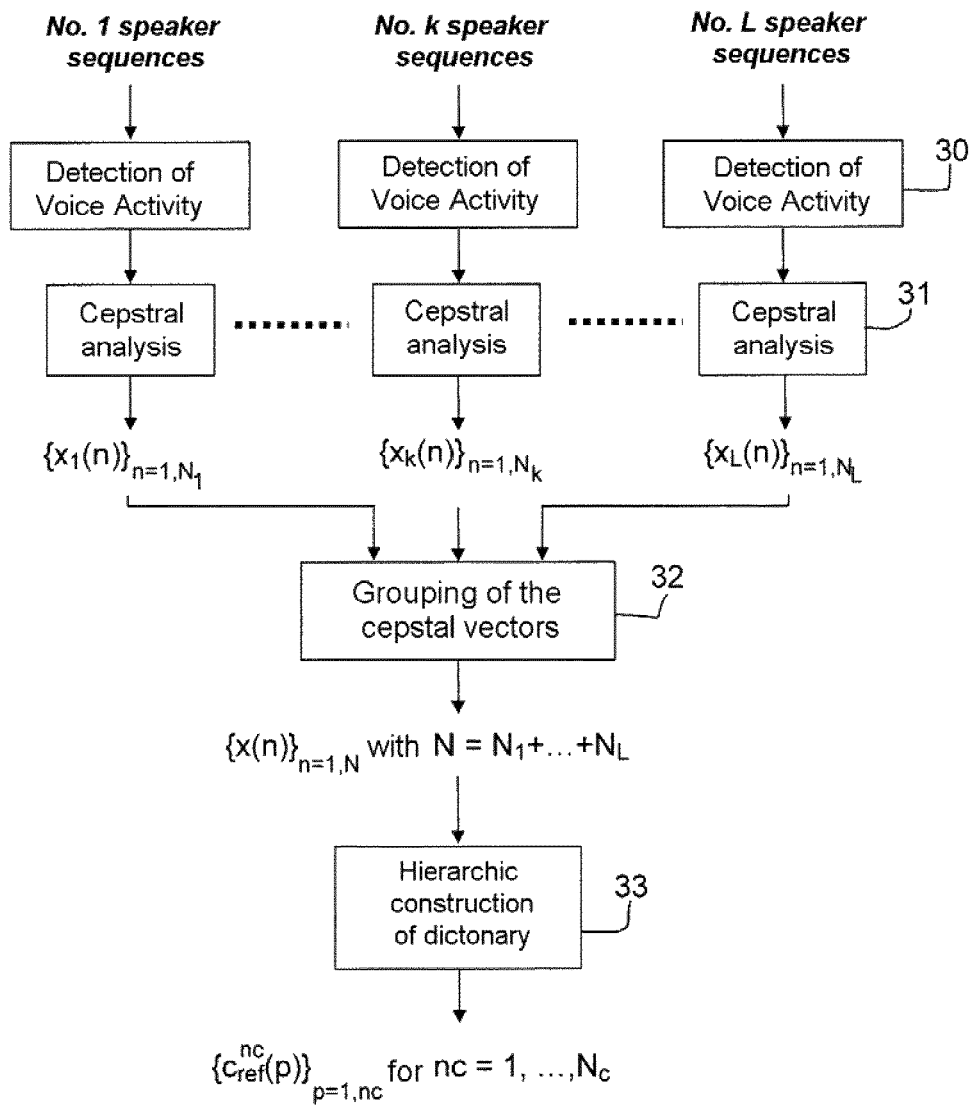

FIG. 2 is a flow diagram of the various steps implemented to construct the reference dictionary Dref. A first step therefore involves construction of a dictionary of N vectors from a set of EI vectors representative of several speakers Lref, where the dictionary is representative of the EI vectors. Numerous algorithms exist which are suitable for achieving this objective. In a non-limiting manner, one general approach comprises minimization of a distortion criterion calculated as the sum of the distances between each of the EI vectors and the vector which is closest to it amongst the N vectors in the dictionary. Therefore, in a first stage a classification operation is carried out: each of the EI vectors is associated with one of the N vectors in the dictionary by minimization of a distance criterion (distance between the cepstral vectors), then in a second stage the distances between the vectors thus associated are totalled. The totalled distance then gives the distortion of the dictionary relative to the data set. One possible algorithm for minimization of this criterion is the K-Means algorithm which works by carrying out successive iterations starting from an initial set of N vectors in the dictionary. The iterations firstly comprise classification of each of the EI vectors, then re-estimation of the N new dictionary vectors as being the mean vectors (or centroids) of each of the classes. These operations are repeated a certain number of times determined in advance or in an automatic manner by making use of a stop criterion (development in distortion below a threshold). Therefore this algorithm permits optimization, in terms of distortion, of a dictionary of fixed size.

A simple way to start the process is to proceed in an incremental fashion. Hence the process commences by estimating the mean vector of the data set. The size of the dictionary is thus increased in an incremental manner by dividing one of the dictionary vectors in two by adding a different perturbation component. After each increase in the number of vectors in the dictionary, a K-means type algorithm is used to optimize the dictionary. When one of the dictionary vectors is divided, several approaches are possible to select the vector to divide. An exhaustive method involves carrying out several tests with different vectors and retaining the choice which in the end minimizes the dictionary distortion. This approach has a high computation time overhead but allows different possibilities to be explored. Another approach involves selection of one of the vectors by using simple basic criteria, for example: based on the class cardinal (division of the most populated class), based on intra-class variance criteria, or combined criteria. A more simple approach involves doubling the number of dictionary vectors at each iteration and thus avoiding selection of the vectors to be divided. At the end of this first step, a set of optimized dictionaries is obtained for all intermediate sizes up to the final size N of the reference dictionary. Under consideration is a hierarchical structuring.

FIG. 2 represents the sequence of steps cited above implemented for the construction of a reference dictionary from Lref speakers. This step is a system configuration step which can be executed outside the system. These different steps correspond to the steps marked 30, 31 in FIG. 2 where the vocal activity for L speakers 1 . . . L, is detected 30, in this example a single set is formed. The vocal activity of each of the speakers is transmitted to a cepstral analysis 31, which follows the approach described above. The cepstral analysis leads, for each of the speakers, to a set of cepstral vectors having several components $xi(n)_{i=1, \ldots Ni}$. These different vectors are grouped 32 into a global vector $\{x(n)\}_{n=1, \ldots N}$ with $N=N_1+ \ldots +N_L$, used for a hierarchical construction of a reference dictionary 33 or a super-vector resulting from the concatenation of the centroids. The dictionary occurs in the form of a set of components $\{c^j_{ref}(p)\}p=1$, P (P=size of the acoustic vectors) for $j=1, \ldots, K$ or a super-vector.

During this step a mean model or super-vector is likewise created. This mean model can be obtained either from speakers who have been chosen to generate the reference dictionary, or indeed by L' speakers believed to represent the mean of the possible speakers. The mean super-vector is determined in a manner identical to that used to construct the reference super-vector, by adding a step in the course of which the mean will be determined using components of the different vectors making up the mean super-vector.

A second step implemented by the inventive process is the learning step or the enrolment step for the different users. It will involve construction of a dictionary for one or several speakers I who will be used during the system learning phase or else during use of the system to generate a public data item Kpub(l) which will be stored in the database 12. This public key will be called by the processor to recognize a speaker during the speaker recognition phase.

The second step is therefore to construct a dictionary of N vectors representative of the learning data of a speaker by using the hierarchical structuring obtained previously. The principle involves projection of the data associated with a speaker in a successive manner in the reference space, the space provided by the reference dictionary Dref. This projection operation takes place by associating the vectors of the speaker dictionary $DI_\alpha$ and those of the reference dictionary Dref (by classification), to calculate the deviation vectors between pairs of associated vectors and to use these deviation vectors to project the data onto the reference space. Each data vector uses a deviation vector obtained by weighting the deviation vectors associated with each dictionary vector. The weighting used takes into account the distance between the vector under consideration and each of the dictionary vectors, and allows introduction of a continuity constraint for the data after projection. According to S. Furui, the weight associated with each deviation vector, is the inverse of the distance (raised to the power alpha) between the vector under consideration and the dictionary vector. The deviation associated with the closest dictionary vector will therefore predominate. The process starts in a simple manner, since it is a question of calculating the mean global vector and of translating the data set by using the deviation vector equal to the difference between the mean reference vector (dictionary of size 1) and the mean vector from the speaker data. The process continues by incrementally increasing the size of the speaker dictionary $D_{Ioc}$ while following the hierarchical structuring of the reference dictionary. The aligned speaker data are classified using the larger size reference dictionary, the mean vectors associated with each class thus considered are calculated, the deviation vectors are determined therefrom, then the data are aligned. This process is repeated until the dictionary of desired size N is obtained.

At no time does this process require the storage of data relating to the speaker, since the process of constructing the speaker dictionary $D_{Ioc}$ by adaptation is carried out during use of the system starting from the test speech sequence.

Only the public data or public keys Kpub(l) corresponding to a speaker I will be stored in the system, in the database 12.

Figure 3:
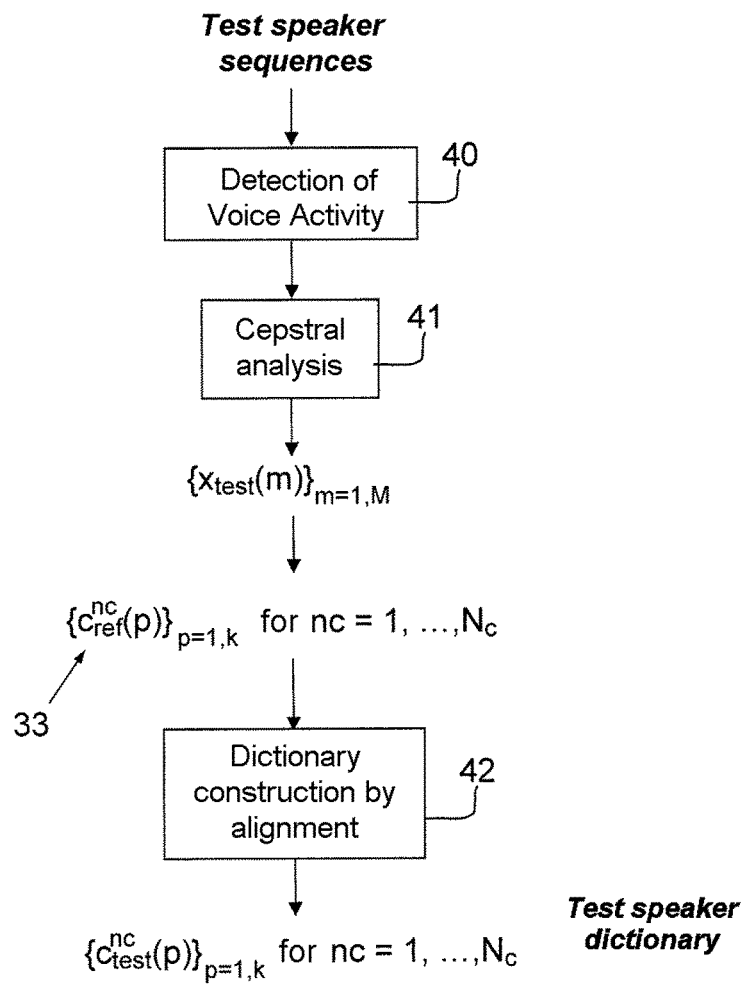

FIG. 3 represents the different stages implemented to construct a dictionary for a test speaker, or in a more general manner for a speaker who will subsequently use the inventive voice recognition system.

Firstly, the voice of the speaker is recorded by an appropriate sensor followed by a vocal activity detection module 40, then the data are transmitted to a cepstral analysis 41, which supplies a set of vectors $_{\{xtest\}}(m)\}_{m=1, \ldots M}$, before being transmitted to a dictionary construction step 42, which uses the dictionary 33 constructed for the reference data (see FIG. 2) $\{c^{nc}_{ref}(p)\}p=1$, P for $nc=1, \ldots, Nc$.

The construction of the various dictionaries relies on the methods detailed below.

K-Means Algorithm—Lloyd Algorithm
1. Initialization: Selection nc Centroids
   Several approaches are possible: random sorting within the set of input vectors, time sampling, centroids resulting from another estimation process etc.

2. Classification of the Set of Input Vectors
Each vector is allocated to the closest centroid
The set of vectors allocated to the same centroid forms a class
3. Updating of the nc Centroids
Each centroid is recalculated from the corresponding class vectors
4. Calculation of Total Distortion
The total distortion is defined as the sum of the distortions for each class
The distortion of a class is defined as the sum of the distances to the centroid of the vector set allocated to this class
5. Stop Criterion
If the total distortion varies less than T %, then the resultant centroid dictionary is saved
if not the process returns to step 2)

Incremental Algorithm for Dictionary Construction. This Algorithm is used to Construct the Reference Dictionary Dref (FIG. 2).

1. Initialization for nc=1
The mean vector is calculated from the set of input vectors
2. Selection of the Class to Subdivide
The class to subdivide is selected according to a predefined criterion
The criterion can be more or less refined: subdivision of the largest class, subdivision of the class with the biggest variance, subdivision of the class which permits optimum convergence of an Nc-Means algorithm, in terms of the total distortion etc.
3. Subdivision of the Selected Class, nc=nc+1
The centroid of the selected class is therefore replaced by two new centroids,
The new centroids can be obtained in several ways: in general, a small change is applied to the original centroid, $c_1 = (1+\epsilon) \times c_0$ $c_2 = (1-\epsilon) \times c_0$ A more optimized method involves changing the centroid along the main axis (extraction of the actual vector from the maximum actual value).

4. Optimization of the Dictionary of Size nc
The nc centroids are optimized using a K-Means type algorithm.
5. Stop Criterion
If the number $N_c$ of centroids required is obtained, or if the total distortion is less than a predefined threshold, the dictionary obtained is saved
if not the process returns to step 2)

Another Possibility is to Use a Binary Burst Algorithm to Construct the Dictionary 1. Initialization for nc=1
The mean vector is calculated from the set of input vectors
2. Subdivision of the Set of Classes nc=2*nc
Each centroid is therefore replaced by two new centroids
The new centroids can be obtained in several ways: in general, a small change is applied to the original centroid, $c_1 = (1+\epsilon) \times c_0$ $c_2 = (1-\epsilon) \times c_0$ A more optimized method involves changing the centroid along the main axis (extraction of the actual vector from the maximum actual value)

3. Optimization of the Dictionary of Size nc
The nc centroids are optimized by using a K-Means type algorithm
4. Stop Criterion
If the number Nc of centroids required is obtained, or if the total distortion is less than a predefined threshold, the dictionary obtained is saved
if not the process returns to step 2)

To construct the speaker dictionary, an approach described in FIG. 3 involves the implementation of the algorithm proposed by S. Furui cited above 1. Hierarchical Construction of a Reference Dictionary
The vectors extracted from speech sequences from L reference speakers are used to construct a dictionary, 40
The algorithm used is of incremental or binary burst type, allowing a hierarchical structuring of the dictionaries for nc=1, ..., NC (incremental) or for nc=1, 2, 4, ..., Nc (binary), 41
The term "reference dictionary" is used to name the set of these dictionaries (of intermediate size), 43
This dictionary is calculated once as a function of the chosen configuration (type of vectors, size of vectors, size of dictionaries, number of reference speakers, learning sequences associated with the reference speakers etc.)
2. Extraction of the Speaker Vectors to be Represented (Test Speaker or Customer)
The same vector extraction scheme is used as is used in obtaining the reference dictionary (the data must be homogenous)
3. Calculation of the Mean Vector for the Test Data (nc=1)
4. Calculation of the Deviation Vector (nc=1)
The deviation vector between two associated classes is defined as the difference between the reference centroid and the test centroid
5. Alignment of the Test Vectors
All the vectors are then translated according to the deviation vector previously calculated
The correspondence between the translated vectors and the original vectors is stored
Hence the test vectors are now in the mean aligned with the reference data
6. Classification of the Test Vectors (nc=nc+1, or nc=2*nck)
Each test vector is allocated to a reference dictionary centroid of higher order (nc=nc+1, or nc=2*nc)
7. Calculation of the nc Centroids of the Test Speaker
Starting from the classification obtained above, the nc centroids are calculated from the vectors of the test speaker
The nc centroids obtained are therefore set in correspondence with the nc reference centroids by construction
8. Calculation of the nc Deviation Vectors
A deviation vector, defined as the difference between the reference centroid and the test centroid, is calculated for each pair of centroids (reference, test)
9. Alignment of the Test Vectors with the Continuity Constraint
Each test vector is translated according to a deviation vector obtained from a linear combination of the deviation vectors previously calculated
The weighting coefficients of the linear combination are calculated from the distance between the test vector and each test centroid (each test centroid corresponding to a deviation vector)
This linear combination ensures a translation with a continuity constraint for the test vectors The correspondence between the translated vectors and the original vectors is stored Detailed description of the translation process: M is the number of vectors of the test speaker sequence The M test vectors (of size P) are given by $x_{test}(m)$, for m=1, ..., M The P components of the nc centroids of the test speaker dictionary, of intermediate size k are given by:

$c^i_{test}(p)$, for p=1, ..., P and for i=1, ..., nc

The P components of the nc centroids of the reference dictionary, of intermediate size k are given by:

$c^i_{ref}(p)$, for p=1, ..., P and for i=1, ..., nc

The P components of the associated nc deviation vectors are given by:

$D^i(p) = c_{ref}^i(p) - c_{test}^i(p)$, for p=1, ..., P and for i=1, ..., nc

The deviation vector applied to the test vector of index m is obtained by linear combination of the preceding deviation vectors:

$$d_{test}^k(m) = \sum_{i=1}^{k} \alpha^k(i) \times D^i, \text{ for } m = 1, \ldots, M$$

The weighting coefficients of the linear combination of the k deviation vectors are given by:

$$\alpha^k(i) = \frac{w^k(i)}{\sum_{i=1}^{k} w^k(i)}, \text{ for } i = 1, \ldots, nc, \text{ with}$$

$$w^k(i) = \frac{1}{d(m,i)^\gamma}$$

and where the distances between the M test vectors (m=1, ..., M) and the nc test centroids (i=1, ..., nc) are obtained in the following way:

$d(m,i) = \|x_{test}(m), c_{test}^k(i)\|$, for m=1, ..., M and i=1, ..., nc

10. Stop Criterion

The test speaker dictionary is obtained when nc=Nc if not the process returns to step 6)

The test word is given as a subscript to designate a test speaker (system user) during the system learning phase or during the authentication or recognition phase.

Once the speaker reference dictionaries have been constructed, the process uses the various items of information during the speaker authentication phase by following the steps which take place in FIG. 2, for example.

The reference dictionaries, and therefore the super-vectors associated with these dictionaries, are ordered; each centroid is supposed to be representative of one and the same zone within the acoustic space whoever the speaker is. This property is obtained by construction. The concatenation of the vectors of one and the same dictionary constitutes a super-vector. It is the super-vector constructed from the dictionary of the speaker to be authenticated which is binarized.

In FIG. 1, an individual 50 who wishes to be authenticated by a system according to the invention, will, in speaking, emit an acoustic speech signal recorded by the sensor 10. The voice recorded by the sensor 10 will next be transmitted to the processor 14 which is adapted to carry out a spectral analysis 51 of the said voice, in order to determine the super-vector associated with the speaker, the mean super-vector M, 13, is next used to binarize the super-vector representative of the speaker to be recognized 52. The binary data 01100101 ... 10 will next be transmitted to the fuzzy extractor (53,55) or any module having identical or equivalent functions notably making it possible to recognize an individual and/or to generate the secret key Ksec(I) for a speaker. The fuzzy extractor is comprised of a "secure sketch" 53 and a strong extractor whose definitions are known to those skilled in the art.

During the learning phase, the "secure sketch" function will generate a public key Kpub(I) associated with a speaker I from the binary data. During the recognition or authentication phase, the function "secure sketch" will use the binary data and the public keys stored in the database to authenticate 55 or not a speaker.

The strong extractor 55 will itself generate a secret key or cryptography key associated with a speaker I or Ksec(I).

During a voice authentication, a series of Nc vectors—referred to as "centroids"—of P real components have been extracted from the voice.

The embodiment described as an illustrative example of the present invention is given for an individual belonging to a population of N users.

This series of Nc vectors is processed to binarize the centroids so that these data can then be used as an input to the fuzzy extractor. Hence a super-vector V representative of the speaker to be authenticated now exists which has (P–1)Nc real components to transform into binary data or binarization (in the cepstra case, the P cepstral vector components exclude the first cepstral coefficient relating to the signal energy). For the binarization step, the process will use the "mean super-vector" M or "mean supervector" of which each component of its K centroids is the (unweighted) mean of the corresponding components of the centroids in the speaker models of the user population or of another population chosen to represent a mean of the speaker population. Hence binarization takes place by comparing the super-vector of the speaker I, V obtained by concatenation of the Nc vectors $(v_i)_{1, \ldots, Nc}$ with the mean super-vector.

Figure 4A:
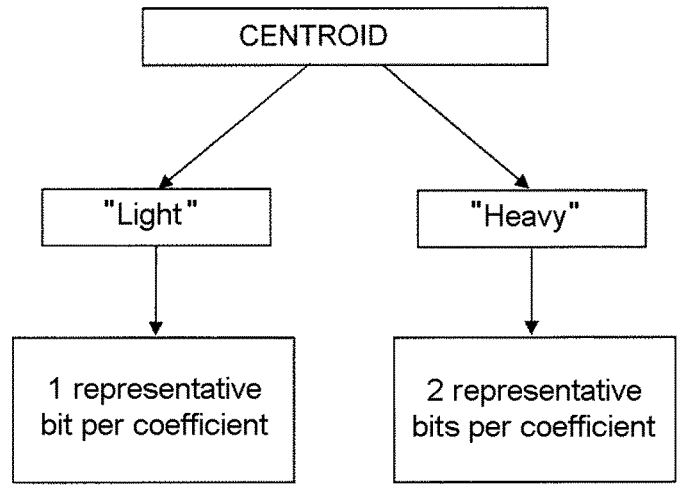
Figure 4B:
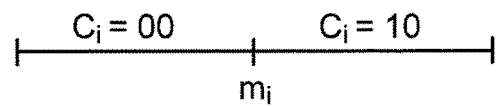
Figure 4C:
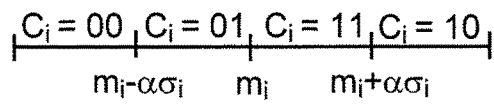

In order to refine the representation, in one embodiment, the process will weight each centroid dependent on the number of cepstral speech vectors which are associated with it in order to carry out a binarization step. This is represented in FIGS. 4A, 4B and 4C. A centroid "ci" can be referred to as "light", in which case the process uses one representative bit per coefficient of the centroid or "heavy", in which case the process can use 2 bits to represent a centroid coefficient.

Knowing the total number of cepstral vectors extracted from the voice sequence, the mean number of cepstral vectors per centroid is calculated. The number of cepstral vectors which are attached to the previously calculated mean super-vector M are compared for each centroid. If the number of cepstral vectors attached to the speaker is greater than the mean number then the centroid is called "heavy", if not it is called "light" and the process will allocate more bits to it than to a "light" centroid.

One of the objectives in proceeding in such a manner is to attach greater importance to the centroids to which the largest number of voice sequence vectors are attached. In this way, each component is coded using two bits, of which only one is significant if the centroid is "light", while both bits are significant if the centroid is "heavy", FIGS. 4A and 4B.

To obtain this result, the process will implement two binarization methods: one which attributes one bit per coefficient (if the centroid is light) and one which attributes two (if the centroid is heavy):

1. That is, a speaker represented by his vector $V=(v_i)_{i=0,\ldots L-1}$, and $M=(m_i)_{i=0,\ldots L-1}$ the ordered mean super-vector, the binarization $b=(b_j)_{j=0,\ldots 2L-1}$ is executed (with one significant bit per coefficient) according to:

$$b_{2i}b_{2i+1} = \begin{cases} 00 & \text{if } v_i \leq m_i \\ 10 & \text{if not} \end{cases}$$

2. Note that $\sigma=(\sigma_i)_{i=0,\ldots nc-1}$ the variance of the different coefficients (calculated for all the centroids of all the speakers), vector_number is the total number of vectors extracted from the voice sequence and n is a parameter allowing balancing of the binary sequence b. The following binarization is thus obtained $b=(b_i)_{i=0,\ldots 2k-1}$ (with two significant bits per coefficient):

$$b_{2i}b_{2i+1} = \begin{cases} 00 & \text{if } v_i \leq m_i - n*\sigma_{i\,mod(nc-1)} \\ 01 & \text{if } m_i - n*\sigma_{i\,mod(nc-1)} < v_i \leq m_i \\ 10 & \text{if } m_i < v_i \leq m_i + n*\sigma_{i\,mod(nc-1)} \\ 11 & \text{if not} \end{cases}$$

In a more general manner, it is possible to generalize the binarization step for n bits. To do this, the process will divide the centroid space into $2^n$ distinct segments and will then allocate a unique binary value between 0 and $2^n$ to each segment. One possibility is to use a Gray code (i.e. two successive segments differ by only one bit). Bearing in mind the properties of fuzzy extractors, in theory it is not necessary for this segmentation to be made up of segments of the same size or any other property than that mentioned above. Taking n=2, the detailed binarization method with 2 bits per coefficient is found, with a space divided into 4 segments.

Adopting the preceding notation, a pseudo-code example follows:

Pseudo-Code:

- For i = 0 to q do
  - Find the weight $p_i$ of the centroid
  - If $p_i \leq$ vector_number / q do
    - For j = 0 to (nc-1) do
      - $\alpha = ((nc-1) * i) + j$
      - $b_{2\alpha}b_{2\alpha+1} = \begin{cases} 00 & \text{if } v_i \leq m_i \\ 10 & \text{else} \end{cases}$
  - Else
    - For j = 0 to (nc-1) do
      - $\alpha = ((nc-1) * i) + j$
      - $b_{2\alpha}b_{2\alpha+1} = \begin{cases} 00 & \text{if } v_i \leq m_i - n*\sigma_{i\,mod\,(nc-1)} \\ 01 & \text{if } m_i - n*\sigma_{i\,mod\,(nc-1)} < v_i \leq m_i \\ 10 & \text{if } m_i < v_i \leq m_i + n*\sigma_{i\,mod\,(nc-1)} \\ 11 & \text{else} \end{cases}$ Exit $b = (b_j)_{j=0,\ldots 2l-1}$ These binarization data and the public key associated with a speaker will be injected in the secure sketch type function module in order to authenticate the speaker I. A "secure sketch" example is the construction "code offset" which produces a public sequence of length identical to the length of the binary sequence created during binarization.

Cod is the correction code (n, k, d) where n is the length of the code, k is the dimension of the code and d is the minimum distance of the code. V is the vector associated with the speaker after binarization for authentication and μ a code word, giving the following construction:

During the enrolment step, the function secure sketch permits determination of the public key Kpub(l) associated with the speaker I which will be stored in the database ss(V)=V xor μ, a public sequence is constructed Pub(I)=ss(V), the two sequences having identical lengths.

During the speaker recognition phase using the super-vector constructed during the recognition phase for a speaker I.

The objective is to find the vector v associated with the speaker by using a vector V' sufficiently close to V. The process stores neither V, nor the code word μ. Starting from the vector V' constructed during the test phase and ss(V) the defined search function is used in the following manner:

REC(V', ss(V))=V' xor ss(V)=μ'

μ'=V' xor V xor μ

If the error e is less than the code correction capacity, then the decoding of μ' yields μ.

Then apply the function ss(V) xor μ to find the vector V associated with the speaker I.

The vector V will be used to generate a secret data item, for example, a cryptographic key Ksec(l) for the speaker I. Its generation can take place, for example, by using a hash function known to those skilled in the art or any other similar function corresponding to the strong extractor function.

These steps are implemented during the creation of the public keys to permit generation of the database containing the public keys.

The solution proposed by the invention notably offers as an advantage an effective compromise for the utilization scenario in which the quantity of speech data may be limited. It remains effective for the case of text-independent speaker recognition or authentication. The inventive proposal also allows construction of a secret data item associated with a speaker. Moreover it offers the advantage of not storing any data which would allow retrieval of the voice characteristics of a person. It applies to numerous fields, such as securing software applications or services, in the field of telecommunications, remote transactions and access to data/services.

The GMM model, which requires more data for a robust learning step, nevertheless permits simultaneous estimation of the means, weights and variances. The binarization process may be applied to the GMM model in the same way.

While there have been shown and described particular features of the invention as applied to preferred embodiments thereof, it will be understood that various omissions, substitutions, and changes in the form and details of the devices illustrated, and in their operation, may be made by those skilled in the art without departing from the spirit and scope of the invention.

The invention claimed is:

1. A system for audio authentication of an individual or speaker comprising:
   a sensor for one or more audio parameters associated with the individual;
   an extraction module for the acoustic parameters from an audio signal;
   a mean model or mean super-vector M representative of the population to be authenticated;
   a reference dictionary including a plurality of vectors and the mean super vector M of speech sequences representative of L reference speakers;

a database containing public keys Kpub(l) of individuals to be authenticated; and a processor adapted for:

generating a speaker dictionary representative of a speaker I to be authenticated by extracting vectors of speech sequences of the speaker I, and projecting the speaker I vectors onto the vectors of the reference dictionary;

decomposing audio signals received by the sensor into vectors representative of the speaker I to be authenticated, transforming a super-vector V of the speaker I resulting from a concatenation of the vectors associated with the said speaker I into binary data taking as an input the mean super-vector M, and comparing the super-vector V of the speaker I with the mean super-vector M; and transmitting the binary data to a module for extracting the speaker authentication taking as an input the public keys Kpub(l) in order to at least one of authenticate the speaker and generate a cryptographic data item Ksec(l) associated with the speaker I;

wherein the audio signal includes a speech signal, and wherein the processor is further adapted to:

transform the speech signals into cepstral vectors;

determine centroids associated with the cepstral vectors of a speaker and to execute transformation of the centroids into binary data using at least a significant bit, by executing the following steps:

comparing the speaker super-vector $V=(v_i)_{i=0,\ldots L-1}$ with the mean super-vector $M=(m_i)_{i=0,\ldots L-1}$; and weighting of each centroid dependent on the number of vectors extracted from the associated speech signal; and transform coordinates of the speaker super-vector V into binary data in the following manner:

the speaker is represented by the super vector $V=(v_i)_{i=0,\ldots L-1}$, and the mean super-vector $M=(m_i)_{i=0,\ldots L-1}$;

the processor executes the binarization $b=(b_j)_{j=0,\ldots 2L-1}$ with one significant bit by the following coefficients:

$$b_{2i}b_{2i+1} = \begin{cases} 00 & \text{if } v_i \leq m_i \\ 10 & \text{if not} \end{cases}$$

in the case of a light centroid and in the case of a heavy centroid;

$\sigma=(\sigma_i)_{i=0,\ldots nc-1}$ is the variance of the different coefficients calculated for all the centroids of all the speakers, wherein nc is the number of centroids of the reference dictionary; and n is a parameter permitting balancing of the binary sequence b;

wherein the processor is adapted to execute the binarization $b=(b_i)_{i=0,\ldots 2L-1}$ with two significant bits by the following coefficients:

$$b_{2i}b_{2i+1} = \begin{cases} 00 & \text{if } v_i \leq m_i - n*\sigma_{i\,mod(nc-1)} \\ 01 & \text{if } m_i - n*\sigma_{i\,mod(nc-1)} < v_i \leq m_i \\ 10 & \text{if } m_i < v_i \leq m_i + n*\sigma_{i\,mod(nc-1)} \\ 11 & \text{if not.} \end{cases}$$

2. The system according to claim 1 wherein the data include speech signals, and wherein the processor is adapted to transform the speech signals into acoustic parameters.

3. A process for audio authentication of an individual comprising the following steps:

recording an audio signal representative of a speaker I to be authenticated and extraction of acoustic parameters from the audio signal;

defining a mean super-vector M representative of the population to be authenticated;

determining public keys Kpub(l) of individuals subject to authentication by performing the following process:

decomposing the audio signal received into vectors representative of the speaker I to be authenticated, transforming a super-vector V of the said speaker I resulting from a concatenation of the vectors associated with the speaker into binary data taking as an input the mean super-vector M resulting from the mean model, and comparing the super-vector V of the speaker with the mean super-vector M; and transmitting the binary data to a module for extracting the speaker authentication taking as an input the public keys Kpub(l) in order to at least one of authenticate the speaker and generate a cryptographic data item Ksec(l) associated with the speaker I wherein the process captures speech signals, the speech signals being transformed into acoustic parameters including cepstral vectors;

the method further comprising a step for determining centroids associated with the cepstral vectors of the speaker I and executing transformation of the centroids into binary data using at least a significant bit, by executing the following steps:

comparing the speaker super-vector $V=(v_i)_{i=0\ldots L-1}$, L being a number of reference speakers, with the mean super-vector $M=(m_i)_{i=0\ldots L-1}$; and weighting of each centroid dependent on the number of vectors extracted from the associated speech signal, the method further comprising a step for transforming coordinates of the speaker super-vector V into binary data in the following manner:

the speaker I is represented by the super vector $V=(v_i)_{i=0,\ldots L-1}$, and the mean super-vector $M=(m_i)_{i=0\ldots L-1}$;

the processor executes the binarization $b=(b_j)_{j=0\ldots 2L-1}$ with one significant bit by the following coefficients:

$$b_{2i}b_{2i+1} = \begin{cases} 00 & \text{if } v_i \leq m_i \\ 10 & \text{if not} \end{cases}$$

in the case of a light centroid and in the case of a so-called heavy centroid;

$\sigma=(\sigma_i)_{i=0,\ldots nc-1}$ is the variance of the different coefficients calculated for all the centroids of all the speakers, wherein nc is a number of centroids; and n is a parameter permitting balancing of the binary sequence b;

wherein the processor is adapted to execute the binarization $b=(b_i)_{i=0,\ldots 2L-1}$ with two significant bits by the following coefficients:

$$b_{2i}b_{2i+1} = \begin{cases} 00 & \text{if } v_i \leq m_i - n*\sigma_{i\,mod(nc-1)} \\ 01 & \text{if } m_i - n*\sigma_{i\,mod(nc-1)} < v_i \leq m_i \\ 10 & \text{if } m_i < v_i \leq m_i + n*\sigma_{i\,mod(nc-1)} \\ 11 & \text{if not.} \end{cases}$$

* * * * *